US008147095B2

(12) United States Patent
Davydov et al.

(10) Patent No.: US 8,147,095 B2
(45) Date of Patent: Apr. 3, 2012

(54) LIGHT SOURCE

(76) Inventors: Maxim Yur'evich Davydov, Moscow (RU); Georgiy Pavlovich Sapt, Moscow (RU)

( * ) Notice: Subject to any disclaimer, the term of this patent is extended or adjusted under 35 U.S.C. 154(b) by 281 days.

(21) Appl. No.: 12/647,968

(22) Filed: Dec. 28, 2009

(65) Prior Publication Data

US 2010/0165628 A1 Jul. 1, 2010

(30) Foreign Application Priority Data

Dec. 29, 2008 (RU) ................................ 2008152161

(51) Int. Cl.

| | |
|---|---|
| ***F21S 8/00*** | (2006.01) |
| ***B60Q 1/14*** | (2006.01) |
| ***F21V 5/00*** | (2006.01) |
| ***F21V 5/04*** | (2006.01) |
| ***G02B 25/00*** | (2006.01) |
| ***G02B 15/14*** | (2006.01) |
| ***G02B 9/00*** | (2006.01) |

(52) U.S. Cl. ........ 362/268; 362/280; 362/281; 362/521; 362/331; 362/335; 359/645; 359/797; 359/689

(58) Field of Classification Search .................. 362/268, 362/280, 281, 521–522, 331, 335–338; 359/689, 359/797, 645, 695, 716, 735, 784
See application file for complete search history.

(56) References Cited

U.S. PATENT DOCUMENTS

| | | | | |
|---|---|---|---|---|
| 5,068,768 | A * | 11/1991 | Kobayashi | 362/539 |
| 5,138,540 | A * | 8/1992 | Kobayashi et al. | 362/268 |
| 6,139,173 | A * | 10/2000 | Hanamori | 362/522 |
| 6,809,869 | B2 * | 10/2004 | Hough | 359/626 |
| 7,896,523 | B2 * | 3/2011 | Drolshagen et al. | 362/259 |
| 2009/0219625 | A1 * | 9/2009 | Yamano et al. | 359/687 |

FOREIGN PATENT DOCUMENTS

| | | | |
|---|---|---|---|
| RU | 2083918 | C1 | 7/1997 |
| RU | 46110 | U1 | 6/2005 |

OTHER PUBLICATIONS

English abstract of RU2083918C1. (1 page).
English abstract of RU46110U1. (1 page).

* cited by examiner

*Primary Examiner* — Jong-Suk (James) Lee
*Assistant Examiner* — David J Makiya
(74) *Attorney, Agent, or Firm* — Rader, Fishman & Grauer PLLC

(57) ABSTRACT

A light source contains at least one light-emitting diode installed in the casing or on the base, and a lens system located along the light flux. The lens system comprises a plane-convex lens, a first plane-concave lens, and a composite lens 4 that are located along the light flux. The composite lens 4 is made up of a second and third plane-concave lenses. Flat surfaces of all of the lenses 4 are outflow faces for the light flux. Axes of symmetry of the second and third plane-concave lenses are normal to each other, whereas axes of symmetry of the first and second plane-concave lenses are parallel to each other. The first plane-concave lens is made movable along the light flux, and has a relocation drive therefor. A solenoid or an electric motor with a gear can be used as the drive. The technical result of the invention is believed to be the improvement of performance indicators, and the structure simplification.

9 Claims, 3 Drawing Sheets

LIGHT SOURCE

CROSS-REFERENCE TO RELATED APPLICATION

This application claims priority to Russian application 2008152161, filed Dec. 29, 2008, which is hereby incorporated by reference in its entirety.

BACKGROUND OF THE INVENTION

1. Field of the Invention

This invention refers to lighting, in particular to instruments providing for artificial lighting, for instance in portable lights, lighting and light-signal devices, and can be used in lighting systems of vehicles (cars, trains, etc.) to create a directional light flux in the process of vehicle movement.

2. Description of Related Art

Known in the art have been numerous light devices.

A light source comprising an incandescent bulb and a lens system is known (Patent RU 2083918 C1, published on Oct. 7, 1997). This device lacks high performance and energy parameters.

Selected as the closest analogue is a light source containing at least one light-emitting diode and a lens system located in the direction of the light flux (Patent RU 46110 U1, published on Oct. 6, 2005). This device is meant for illumination of objects mainly in microscopy. Shortcomings of this known device are its limited performance potential and structural complexity.

BRIEF SUMMARY OF THE INVENTION

The present invention is aimed at solving a problem of creating a light flux having optimal parameters and providing for efficient illumination of distant objects, for example, in the process of vehicle movement.

The following cumulative technical results are achieved as the problem is solved: the lighting device design is simplified, the loss of brightness is reduced, a quick changing of a light flux on retention of its maximal power capacity and changing of light flux intensity in a wide range are secured, a light beam with optimal optical parameters and high output performance is created, and the adjustment to comply with required standards becomes easier.

The above-mentioned technical results are achieved by providing a light source comprising at least one light-emitting diode and a lens system located in the direction of a light flux. The lens system comprises a plane-convex lens, a plane-concave lens and a composite lens that are sequentially located in the direction of the light flux. The composite lens is made up of two plane-concave lenses. The flat surfaces of the lenses are outflow faces for the light flux. The plane-concave lenses have a curvature radius from 12 mm to 56 mm.

The above-mentioned technical results can also be achieved by providing a light source comprising at least one light-emitting diode and a lens system located in the direction of a light flux. The lens system comprises a plane-convex lens, a plane-concave lens and a composite lens that are sequentially located in the direction of the light flux. The composite lens is made up of two plane-concave lenses. The flat surfaces of the lenses are outflow faces for the light flux. A plane-concave lens is adapted to be moveable in the direction of the light flux. The plane-concave lenses have a curvature radius from 12 mm to 56 mm.

The above-mentioned technical results can also be achieved by providing a light source comprising at least one light-emitting diode and a lens system located in the direction of a light flux. The lens system comprises a plane-convex lens, a plane-concave lens and a composite lens that are sequentially located in the direction of the light flux. The composite lens is made up of two plane-concave lenses. The flat surfaces of the lenses are outflow faces for the light flux. A plane-concave lens is adapted to be moveable in the direction of the light flux, and has a relocation drive. The plane-concave lenses have a curvature radius from 12 mm to 56 mm.

DETAILED DESCRIPTION OF THE INVENTION

Various light emission sources are meant for the use in various situations. Upon illuminating objects, a problem of creating a light field optimal in terms of perception physiology is to be solved. In a number of cases, for example for vehicles, different light fields have to be created promptly (so-called low beam and high beam). Most commonly used lighting systems including incandescent lamps, reflectors and coupled lens have serious disadvantages of high energy consumption, heating during operation, loss of brightness because of the light flux reflection, etc. Lighting devices using light-emitting diodes are free from those disadvantages. However, the use of light-emitting diodes necessitates special-purpose light flux shaping devices since light-emitting diodes radiates a light flux with a divergence angle of about 10 degrees. Most promising are systems that exclude the light flux reflection and form a light flux with needed parameters exclusively as a result of light refraction in the optical system.

Figure 1:
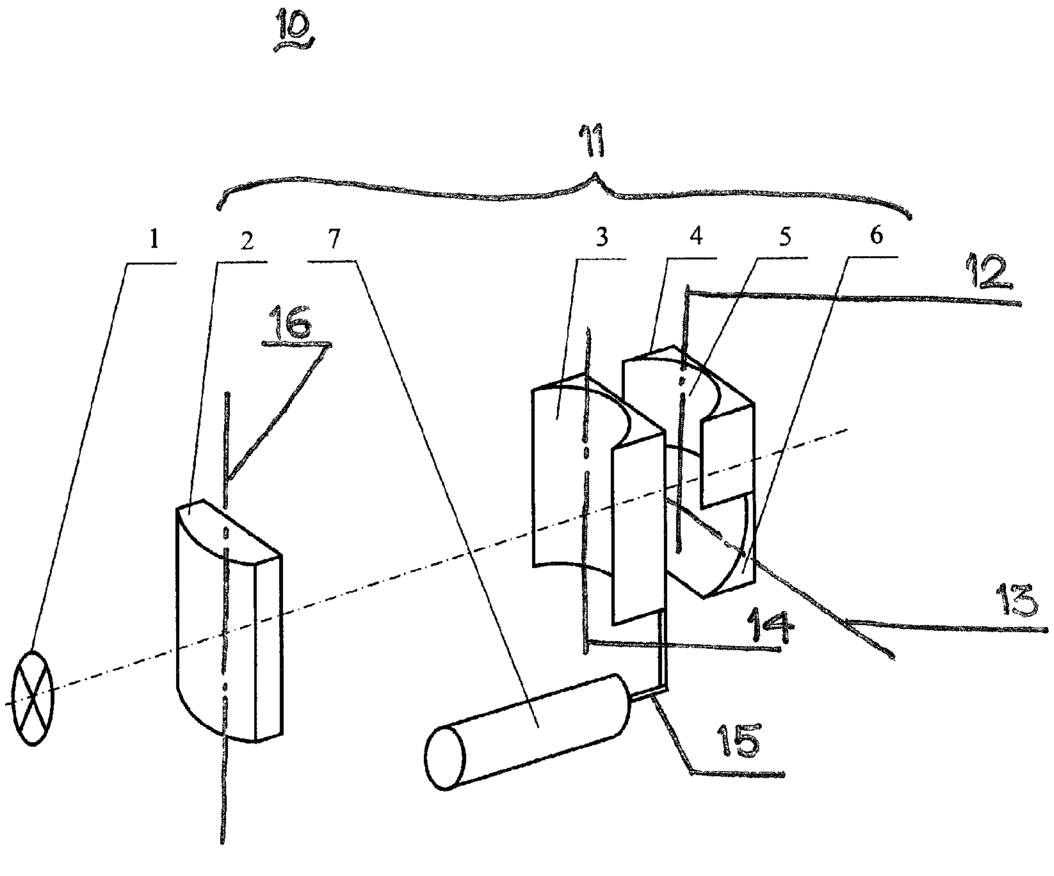
FIG. 1 and FIG. 2 show a light source according to the present invention, the figures differing from each other by the type of the drive used.
Figure 2:
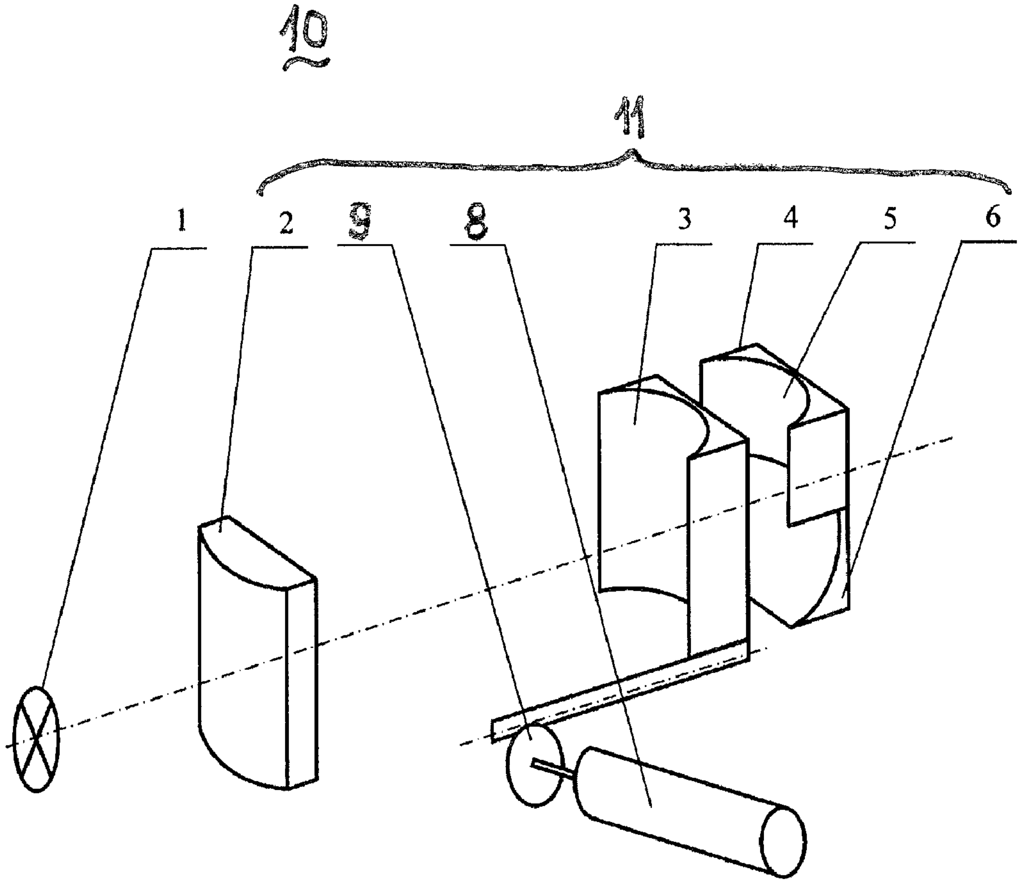
Figure 3:
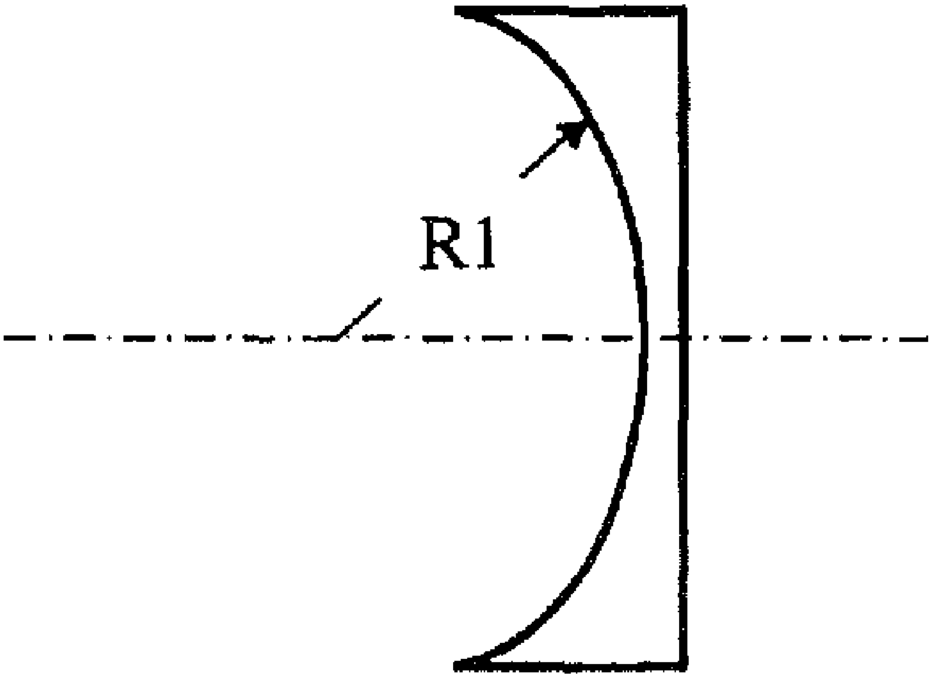
FIG. 3 shows a plane-concave lens profile.

Referring now to FIGS. 1-3, a light source 10 (and a vehicle head lamp created on its basis) comprises at least one light-emitting diode 1 installed in a case or on a base (not shown), and a lens system located in the direction of the light flux. Matrices or assemblies the size of 10 mm to 40 mm of several light-emitting diodes can also be used.

A lens system 11 includes a plane-convex lens 2, a plane-concave lens 3 and a composite lens 4 that are successively located in the direction of the light flux. The composite lens 4 is made up of two plane-concave lenses 5 and 6. Flat surfaces of lenses 2, 3 and 4 are outflow faces for the light flux. The plane-concave lens 3 can be installed with a possibility to be relocated along the light flux, and has a relocation drive including a solenoid 7.

In functional terms, the plane-convex lens 2 is positive, i.e. is a collecting lens. The lenses 3 and 4 are negative, i.e. spreading. It was experimentally established that it is most expedient to use lenses with cylindrical surfaces, however spherical lenses can be used as well.

Symmetry axes 16 and 14 of the plane-convex lens 2 and plane-concave lens 3, respectively, are parallel to each other. The composite lens 4 consists of two lenses located one above the other: the plane-concave upper lens 5 and the plane-concave lower lens 6. The lenses 5 and 6 have cylindrical concave surfaces basically of the same radius. Symmetry axes 12 and 13 of the lenses 5 and 6, respectively, are perpendicular to each other. Heights of the lenses 5 and 6 are mainly identical, and make half of the total height of the composite lens 4. The composite lens 4 is made in such a way that the symmetry axis 12 of the upper lens 5 is parallel to the symmetry axis 14 of plane-concave lens 3, and the a symmetry axis 13 of the lower lens 6 is perpendicular to the symmetry axis 14 of the plane-concave lens 3. It is most advisable to choose a curvature radius R1 of the plane-concave lenses 3, 5 and 6 in the range of 12 mm to 56 mm, and a radius of the plane-convex lens 2 in the range from 20 mm to 80 mm depending on the task. With the radius values below the 12 mm and 20 mm, a light beam will not be large enough to illuminate the required area. With the radius values above the 56 mm and 80 mm, the devices are growing substantially in size, lenses manufacture becomes more complicated, and reliability decreases since larger lenses are more susceptible to faults, failures, etc.

To make the lens 3 movable, the base or casing, in which the component parts are installed, is provided with guide ways that can be made with any known method.

The solenoid 7 can be used as a drive to move the plane-concave lens 3, a guide bar 15 of the solenoid being connected with the lens 3, as it is shown in FIG. 1. Alternatively, an electric motor 8 and a rack-and-gear drive 9 or a screw drive such as a worm gear can be used as the drive. Also, a pneumatic or hydraulic cylinder (not shown), a guide bar of which would be connected with the lens 3, can be alternatively used as the drive.

The lenses can be made with any known method from any suitable material, and can have in particular an antireflection coating. The lenses can also fulfill a function of filters to form a light flux with the needed spectrum.

The light source 10 functions as follows.

The light-emitting diode 1 and lenses 2, 3, and 4 are installed on the base (not shown) or in casing (not shown), and the light-emitting diode 1 is connected to an electric energy source (not shown). After the connection, the light source 10 is being adjusted to get a light flux with needed parameters. To that end, the plane-concave lens 3 is relocated along the axis by means of the solenoid 7, or motor 8, or other conventional drive and fixed in the needed position. The light flux that is sequentially refracted in the plane-convex lens 2, plane-concave 3 and composite lens 4 acquires needed geometric, energetic and/or spectral parameters.

As the need arises to adjust a light flux, for instance when a vehicle light is switched from a low beam to high beam, the relocation drive operates the lens 3 relocating it along the light source optical axis. As a result, the light flux acquires the needed distribution of brightness, intensity and other energetic parameters.

The following cause-and-effect relation exists between essential features of devices and the disclosed technical results. The provision of the fast change of the light flux with retention of its maximal power, and providing for the change of the light flux intensity in a wide range are achieved through the lenses system design and a possibility to relocate the mid-lens 3. Creating a light beam with optimal optical parameters is brought about by the use of the input collecting lens 2 followed by two spreading lenses 3 and 4, the output lens 4 being composite and made up of two plane-concave lenses 5 and 6. High output performance is conditioned by the use of the whole light flux emitted by the light-emitting diode 1, and by the minimization of the power losses. Simplification of adjustment to comply with the required standards is achieved through making only one optical system element adjustable—the plane-concave lens 3, which means that when assembling the devices there is no need for imposing requirements upon especially accurate installation of all component parts since inaccuracies can be easily eliminated by way of the relocation of the lens 3. Simplification of the light source and reduction of brightness losses came about through eliminating reflectors.

The invention claimed is:

1. A light source comprising:
at least one light-emitting diode and
a lens system,
the lens system being located in the direction of a light flux,
the lens system comprising successively arranged:
a plane-convex lens,
a first plane-concave lens, and
a composite lens,
the composite lens comprising a second and a third plane-concave lenses,
axes of symmetry of the second and third plane-concave lens being normal to each other,
axes of symmetry of the first and second plane-concave lens being parallel to each other,
flat surfaces of the plane-convex lens and the first, second, and third plane-concave lenses being outflow faces for the light flux,
the first plane-concave lens being adapted to be movable in the direction of the light flux.

2. The light source as claimed in claim 1 wherein the movability of the first plane-concave lens is provided for by a drive.

3. The light source as claimed in claim 2 wherein the drive includes a solenoid.

4. The light source as claimed in claim 2 wherein the drive includes an electric motor with a rack-and-gear mechanism.

5. The light source as claimed in claim 2 wherein the drive includes an electric motor and a screw drive.

6. The light source as claimed in claim 2 wherein the drive includes a pneumatic or a hydro cylinder.

7. The light source as claimed in claim 1 wherein the plane-concave lenses have a curvature radius from 12 mm to 56 mm.

8. A light source comprising:
at least one light-emitting diode and
a lens system,
the lens system being located in the direction of a light flux,
the lens system comprising successively arranged:
a plane-convex lens,
a first plane-concave lens, and
a composite lens,
the composite lens comprising a second and a third plane-concave lenses,
axes of symmetry of the second and third plane-concave lens being normal to each other,
axes of symmetry of the first and second plane-concave lens being parallel to each other,
flat surfaces of the plane-convex lens and the first, second, and third plane-concave lenses being outflow faces for the light flux,
the plane-concave lenses having a curvature radius from 12 mm to 56 mm,
the first plane-concave lens being adapted to be movable in the direction of the light flux.

9. A light source comprising:
at least one light-emitting diode,
a lens system, and
a drive,
the lens system being located in the direction of a light flux,
the lens system comprising successively arranged:
a plane-convex lens,
a first plane-concave lens, and
a composite lens, the composite lens comprising a second and a third plane-concave lenses, axes of symmetry of the second and third plane-concave lens being normal to each other, axes of symmetry of the first and second plane-concave lens being parallel to each other, flat surfaces of the plane-convex lens and the first, second, and third plane-concave lenses being outflow faces for the light flux, the plane-concave lenses having a curvature radius from 12 mm to 56 mm, the first plane-concave lens being adapted to be movable in the direction of the light flux, the movability of the first plane-concave lens being provided for by the drive.

* * * * *